United States Patent Office 2,851,333
Patented Sept. 9, 1958

2,851,333

PROCESS OF SEPARATING PLUTONIUM FROM URANIUM

Harrison S. Brown, Oak Ridge, Tenn., and Orville F. Hill, Richland, Wash., assignors to the United States of America as represented by the United States Atomic Energy Commission No Drawing. Application March 9, 1945
Serial No. 581,949

5 Claims. (Cl. 23—14.5)

Our invention relates to a process for separating the recently discovered element plutonium from solutions thereof. More particularly, it is concerned with the separation of dissolved plutonium from such solutions by the use of a novel carrier therefor.

It is known that plutonium can be produced in small quantities by the bombardment of uranium metal with slow or thermal neutrons. The designation "plutonium" or "element 94" as used throughout the present description refers to the transuranic element having an atomic number of 94. The expression "$94^{239}$" means the isotope of element 94 has an atomic weight or mass of 239. Similarly, the terms "element 93" or "Np" refer to the new element known as neptunium having an atomic number 93.

Uranium is composed of three isotopes, namely, $U^{234}$, $U^{235}$ and $U^{238}$, the latter being present in excess of 99 percent of the whole. When $U^{238}$ is subjected to the action of slow or thermal neutrons, a fourth isotope, $U^{239}$, is produced which has a half-life of 23 minutes and undergoes beta decay to $Np^{239}$ which decays by beta radiation with a half-life of 2.3 days to yield the plutonium isotope $94^{239}$. In addition to the formation of the transuranic elements neptunium and plutonium, there are simultaneously produced other elements of lower atomic weight known as fission fragments. These fission fragments are composed of two distinct element groups, i. e., a light and heavy element group. The light group contains elements having atomic numbers of between about 35 and 46 while the heavier group is composed of elements of atomic numbers varying between about 51 and 60. The elements of these groups as originally produced are considerably overmassed and undercharged and hence are highly unstable. By beta radiation, however, they quickly transform themselves into isotopes of these various elements having longer half-lives. The fission fragments and their resulting decay products are commonly known as fission products. These fission products comprise isotopes of various elements having atomic numbers from about 32 to 64.

It is an object of our invention to provide a new and efficient carrier for plutonium.

It is a further object of our invention to provide conditions such that dissolved plutonium can be precipitated from its solutions when said element is in either the tetravalent or hexavalent state.

Other objects of our invention will be apparent from the description which follows.

We have now discovered that plutonium either in its tetravalent or hexavalent state can be readily and effectively removed from solutions thereof by the use of uranous or uranyl hydroxides. Broadly, our invention involves the formation of either uranous or uranyl hydroxides in the plutonium-containing solution under conditions which result in the precipitation of uranium hydroxide with plutonium probably as the hydroxide. The resulting precipitate may then be removed by filtration or other convenient means after which it is redissolved and the pH of the solution formed is adjusted to a value at which the uranium hydroxide precipitates, leaving the plutonium in solution. The uranium hydroxide precipitate is then separated by filtration and the plutonium contained in the filtrate is recovered either in the form of its hydroxide by increasing the basicity of the solution or by converting the plutonium to a substantially insoluble compound in a known manner.

In its preferred embodiment, our invention consists essentially of recovering plutonium from dilute solutions thereof by forming a hydroxide of uranium therein at a pH of about 5.0 or above, and preferably between about 5 and 10. Under such conditions uranium, either in the tetravalent or hexavalent state, forms an insoluble hydroxide and carries down with it the plutonium which may be either in the −4 or +6 state. The precipitate thus obtained is next dissolved in a suitable, and preferably a mineral, said such as, for example, sulphuric, nitric or hydrochloric acid, after which the pH of the resulting solution is adjusted to a value not substantially greater than about 2.5 by the addition of sodium hydroxide, sodium bicarbonate, ammonium hydroxide, or a similar inorganic base. As a result, the uranium hydroxide precipitates, leaving plutonium in solution. The uranium-containing precipitate is then separated by filtration, and the plutonium can be recovered from the filtrate by converting it to a substantially insoluble compound, such as the iodate or peroxide, in accordance with methods well-known to the art.

The uranium hydroxide utilized in our process may be formed in accordance with any known method. For example, it may be preformed and introduced into the solution. However, it is preferred to accomplish this object by precipitating the uranium hydroxide in situ. This may be accomplished by introducing into the plutonium-containing solution a soluble uranium compound wherein the uranium is in either the tetravalent or hexavalent state and thereafter adding a suitable base, such as sodium hydroxide, sodium bicarbonate, ammonium hydroxide, and the like, until a pH of about 5.0 or above is reached. Also, in this connection, it is to be specifically understood that the expression "uranium hydroxide" as employed in the present description and claims is intended to cover uranium hydroxide compositions including basic uranium salts comprising a uranium hydroxide in which uranium may have any convenient valence, for example, either 4 or 6. Furthermore, while the exact composition of such compounds is not accurately known, it is believed that the product precipitated from the acid solutions consists chiefly of a mixture of plutonium hydroxide and/or the basic plutonium salt of the acid present in the solution from which the plutonium is precipitated, together with the corresponding uranium compound. However, it is to be clearly understood that such terminology is intended to cover the formation of the solid product obtained by contacting a soluble uranium compound with a base of the above mentioned type in the presence of acidic or neutral conditions regardless of its chemical composition. Likewise, the expression "plutonium hydroxide" as used throughout the present description and claims is intended to refer to the solid phase obtained by the addition of a base of the above mentioned class to an acid or neutral solution of plutonium. Furthermore, it is to be strictly understood that we do not desire to be restricted in any way whatever to precipitates of the above described composition, but on the contrary, we intend to cover by such terminology all plutonium-containing precipitates which may be produced by hydroxyl ions.

Our invention may be further illustrated by the following specific example:

Example

To 10 cc. solution containing $94^{238}$ tracer as $Pu^{+4}$ and 25 mg. of $U^{+4}$ ion in the form of uranium tetrachloride, ammonium hydroxide was added until the desired pH was obtained. The quantity of plutonium carried by the uranium hydroxide precipitate was measured in each case as well as the amount remaining in solution. The ability of uranium hydroxide to carry plutonium is demonstrated by the data appearing in the following table:

| pH | Percent Plutonium in precipitate | Percent Plutonium in supernatant |
|---|---|---|
| 2.25 | 10 | 90 |
| 2.65 | 29 | 71 |
| 5.0 | 97.8 | 2.2 |
| 7.75 | 97 | 3 |
| 9.2 | 98 | 2 |

While the above example and general description are illustrative of certain specific applications of our invention, it is to be clearly understood that said invention is not limited thereto, since it will be apparent to those skilled in the art that the present invention is subject to numerous alterations and modifications without departing from the scope thereof. For example, our process is admirably suited to the recovery of extremely small quantities of plutonium present in the liquors resulting from the washing of plutonium-containing carrier precipitates obtained by treating solutions of neutron-irradiated uranium with a suitable carrier for plutonium. In general, it may be said that any procedure involving the removal of plutonium including any isotope thereof by the use of uranium hydroxide as a carrier therefor is to be considered as lying within the scope of this invention.

We claim:

1. A process for recovering plutonium values from solutions containing the same, which comprises introducing a uranous hydroxide into said solution at a pH of at least about 5.0 so that the said plutonium is precipitated and carried by said uranous hydroxide, separating the resulting carrier precipitate from said solution, dissolving said precipitate in acid solution, adjusting the pH of the resulting solution to a value of about 2.5 thereby precipitating uranous hydroxide substantially free from plutonium, and recovering the plutonium from said solution.

2. A process for recovering plutonium values from solutions containing the same, which comprises forming a uranium hydroxide precipitate in said solution at a pH of at least about 5.0 whereby said plutonium values are carried by the precipitate formed, separating the resulting precipitate from the solution, dissolving the precipitate in acid solution, adjusting the pH of the resulting acid solution to a value of about 2.5 thereby precipitating uranous hydroxide substantially free from plutonium values, and recovering the plutonium values from said solution.

3. A process for recovering plutonium values from solutions containing the same, which comprises forming a uranium hydroxide precipitate in said solution at a pH of at least about 5.0 whereby said plutonium values are carried by the precipitate formed, separating the resulting precipitate from the solution, dissolving the precipitate in acid solution, adjusting the pH of the resulting acid solution to a value of about 2.5 thereby precipitating uranous hydroxide substantially free from plutonium values, removing said uranous hydroxide by filtering, and recovering the plutonium values from said solution.

4. A process for recovering plutonium values from solutions containing the same, which comprises forming a uranous hydroxide precipitate in said solution at a pH of from 5 to 10 whereby said plutonium values are carried by the precipitate formed, separating the resulting precipitate from the solution, dissolving the precipitate in acid solution, adjusting the pH of the resulting acid solution to a value of about 2.5 thereby precipitating uranous hydroxide susbtantially free from plutonium values, and recovering the plutonium values from said solution.

5. A process for recovering plutonium values from solutions containing the same, which comprises forming a uranium hydroxide precipitate in said solution by adding a water-soluble uranous salt and adjusting the pH with ammonium hydroxide to about 5.0 whereby said plutonium values are carried by the precipitate formed, separating the resulting precipitate from the solution, dissolving the precipitate in acid solution, adjusting the pH of the resulting acid solution to a value of 2.5 thereby precipitating uranous hydroxide substantially free from plutonium values, and recovering the plutonium values from said solution.

References Cited in the file of this patent

Friend: Textbook of Inorganic Chemistry, vol. VII, part III, p. 302 (1926), publ. by Charles Griffin & Co., Ltd., London.

Britton: Hydrogen Ions, 1929, page 278.

Michiels et al.: Production of Neutrons by the Fission of Uranium, Nature, vol. 143, p. 760 (1939).

Booth et al.: Neutron Capture by Uranium (238), Physical Rev., vol. 58, pp. 475, 476 (1940).

Seaborg: The Chemical and Radioactive Properties of the Heavy Elements, Chemical and Eng. News, vol. 23, pp. 2190–2193 (1945).